United States Patent [19]
Kobayashi et al.

[11] Patent Number: 5,574,087
[45] Date of Patent: Nov. 12, 1996

[54] MOLDED PROTECTIVE STRIP FOR AUTOMOBILES

[75] Inventors: Yutaka Kobayashi, Ichihara; Takayuki Onda, Wako; Kenji Hamabe, Wako; Osamu Aoki, Wako, all of Japan

[73] Assignees: Idemitsu Petrochemical Co., Ltd.; Honda Giken Kogyo Kabushiki Kaisha, both of Tokyo, Japan

[21] Appl. No.: 413,176

[22] Filed: Mar. 29, 1995

[30] Foreign Application Priority Data

Mar. 30, 1994 [JP] Japan ..................... 6-060713

[51] Int. Cl.$^6$ ............... C08K 3/22; C08L 53/00
[52] U.S. Cl. ............ 524/451; 525/88; 264/572; 296/901
[58] Field of Search ............. 524/451; 525/88

[56] References Cited

U.S. PATENT DOCUMENTS

| | | | |
|---|---|---|---|
| 4,363,885 | 12/1982 | Fukui et al. | 524/451 |
| 4,439,573 | 3/1984 | Fukui et al. | 524/451 |
| 5,039,525 | 8/1991 | Tamashima et al. | 524/451 |

FOREIGN PATENT DOCUMENTS

| | | |
|---|---|---|
| 0265075 | 4/1988 | European Pat. Off. |
| 62-235350 | 10/1987 | Japan . |
| 63-122751 | 5/1988 | Japan . |

*Primary Examiner*—Carman J. Seccuro, Jr.
*Attorney, Agent, or Firm*—Oblon, Spivak, McClelland, Maier & Neustadt, P.C.

[57] ABSTRACT

A molded protective strip for automobiles is prepared by the gas injection molding of a resin composition which comprises (A) 55 to 75% by weight of polypropylene, (B) 18 to 30% by weight of ethylene-propylene copolymer rubber, and (C) 10 to 20% by weight of talc, has a ratio $(MI)_{PP}/(MI)_{EPR}$ of 10 or less, and a polydispersity index of 20 to 100. $(MI)_{PP}$ and $(MI)_{EPR}$ represents melt indices of the polypropylene of component (A) and the ethylene-propylene copolymer rubber of component (B), respectively. The polydispersity index is calculated from a frequency-storage modulus curve obtained with a composition consisting of components (A), (B), and (C) alone at the temperature of 230° C. The molded protective strip can be prepared without using a vinyl chloride resin, shows almost no heat shrinkage, has a small coefficient of linear expansion, is excellent in dimensional stability, and exhibits excellent appearance.

6 Claims, 1 Drawing Sheet

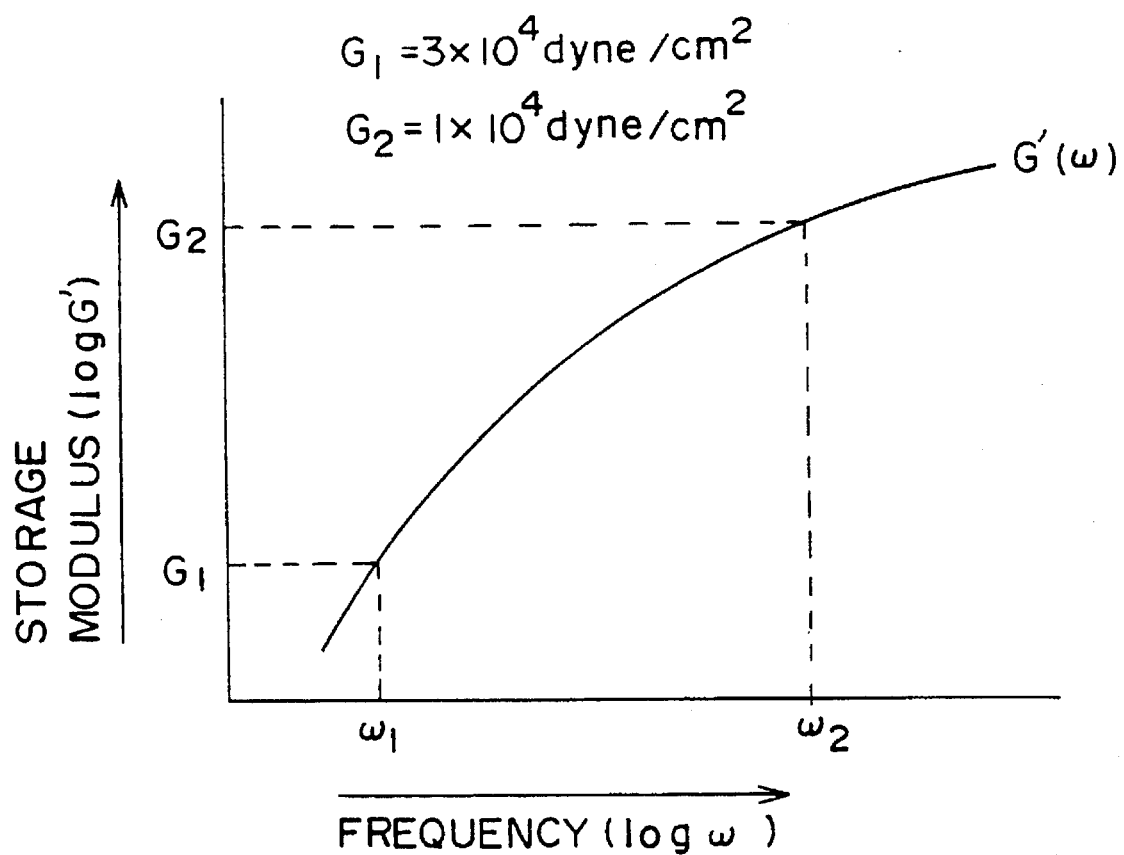

MOLDED PROTECTIVE STRIP FOR AUTOMOBILES

BACKGROUND OF THE INVENTION

1. Field of the Invention

The present invention relates to a molded protective strip for automobiles. More particularly, the present invention relates to a molded protective strip for automobiles which can be prepared without using a vinyl chloride resin, shows almost no heat shrinkage, has a small coefficient of linear expansion, is excellent in dimensional stability, and exhibits excellent appearance as an exterior part of automobiles.

2. Description of the Related Arts

Heretofore, side protective strips for automobiles have been produced mainly by using vinyl chloride resins. However, vinyl chloride resins have a drawback in that toxic gases are generated when they are burnt for disposal. Number of type of resin used in automobiles are being reduced to promote recycling of resins. Vinyl chloride resins are progressively being replaced by polypropylene resins because of these reasons. However, polypropylene resins have a drawback in that the resins have large coefficients of linear expansion because of their crystallizing nature, and show large dimensional changes when long molded articles such as protective strips are prepared by using them. Recently, the gas injection molding process (referred to as GIM, hereinafter) is used for molding various products for the purpose of simultaneously keeping strength and decreasing weight of the molded products [for example, "Nikkei Materials and Technology", Volume 135, Page 44 (1993)]. In GIM, a cavity is formed at the inside of the molded product by injecting a gas into the mold during the injection molding. This process has enabled designs of uneven thickness and hollow structures which are impossible by the conventional injection molding. Therefore, this process has the advantage of achieving simultaneous reduction in weight and cost.

In spite of the advantage described above, it is the real situation that no attempt has been made to increase accuracy of long molded articles, such as protective strips for automobiles, by using GIM.

SUMMARY OF THE INVENTION

Extensive studies were undertaken by the present inventors with the object of developing a molded protective strip which can be prepared by GIM, does not use a vinyl chloride resin, shows almost no heat shrinkage, has a small coefficient of linear expansion, is excellent in dimensional stability, and exhibits excellent appearance as an exterior part of automobiles.

As the result of the studies, it has been discovered that the object can be achieved by preparing a molded protective strip for automobiles by GIM of a resin composition which comprises polypropylene, an ethylene-propylene copolymer rubber, and talc in specified amounts, and has a ratio $(MI)_{PP}/(MI)_{EPR}$ and a polydispersity index (referred to as PDI, hereinafter) within respective specific ranges, wherein the ratio $(MI)_{PP}/(MI)_{EPR}$ is the ratio of the melt index of the polypropylene $(MI)_{PP}$ and the melt index of the ethylene-propylene copolymer rubber $(MI)_{EPR}$, and PDI is obtained with a composition composed of the three components described above alone. The present invention has been completed on the basis of the discovery.

Thus, the present invention provides a molded protective strip for automobiles prepared by GIM of a resin composition which:

comprises (A) 55 to 75% by weight of polypropylene, (B) 18 to 30% by weight of ethylene-propylene copolymer rubber, and (C) 10 to 20% by weight of talc;

has a ratio $(MI)_{PP}/(MI)_{EPR}$ of 10 or less, wherein $(MI)_{PP}$ represents a melt index of the polypropylene of component (A) and $(MI)_{EPR}$ represents a melt index of the ethylene-propylene copolymer rubber of component (B); and has PDI of 20 to 100, wherein PDI is calculated from a frequency-storage modulus curve obtained with a composition consisting of components (A), (B), and (C) alone at the temperature of 230° C.

Other and further objects, features and advantages of the invention will appear more fully from the following description.

BRIEF DESCRIPTION OF THE DRAWING

The invention will be described with reference to the accompanying drawing. FIG. 1 shows a frequency-storage modulus curve of a resin composition used for the molded protective strip for automobiles of the present invention. The method of calculating PDI of the resin composition is described by using this curve.

DESCRIPTION OF PREFERRED EMBODIMENTS

In the resin composition used in the molded protective strip of the present invention, the polypropylene (referred to as PP, hereinafter) used as component (A) is not particularly limited. Preferable examples include isotactic propylene homopolymer having crystalinity, ethylene-propylene random copolymers having a small content of ethylene unit, propylene block copolymers composed of a homopolymer part consisting of propylene homopolymer and a copolymer part consisting of ethylene-propylene random copolymer having a relatively large content of ethylene unit, and crystalline propylene-ethylene-α-olefin copolymers having a structure which is obtained by additionally containing a copolymerized α-olefin unit, such as butene-1 unit, in the homopolymer part or the copolymer part of the propylene block copolymer described above. The melt index (referred to as MI, hereinafter) (measured at 230° C. with a load of 2.16 kg) of PP is not particularly limited, and is preferably 0.5 to 100 g/10 minutes, more preferably 1 to 60 g/10 minutes. When MI is in the range of 0.5 to 100 g/10 minutes, PP is excellent in moldability. When MI is in the range of 1 to 60 g/10 minutes, PP is more excellent for use in the injection molding.

PP of component (A) may be used singly, or as a combination of two or more types. The amount of component (A) in the resin composition can be selected in the range of 55 to 75% by weight, preferably 60 to 75% by weight, more preferably 60 to 70% by weight, of the resin composition. When the amount is less than 55% by weight, properties, such as stiffness and the like, of the molded product obtained is inferior. When the amount is more than 75% by weight, sufficient dimensional stability is not obtained. When the amount is in the range of 60 to 75% by weight, or in the range of 60 to 70% by weight, the product is more excellent in dimensional stability.

In the resin composition, the ethylene-propylene copolymer rubber of component (B) may be a copolymer of ethylene and propylene, or a copolymer of ethylene, propylene, and a non-conjugated diene. Any process for preparation of the copolymer rubber and any type of non-conjugated diene for the copolymer rubber can be suitably selected and used as long as the desired structures and properties can be obtained.

The ethylene-propylene copolymer rubber is an amorphous polymer or a polymer having a low crystallinity, and has an initial modulus, measured according to the method of Japanese Industrial Standard K6301, of 400 kg/cm$^2$ or less, preferably 200 kg/cm$^2$ or less, more preferably 100 kg/cm$^2$ or less. The content of the ethylene unit in the copolymer rubber is preferably from 40 to 80% by weight because of high impact properties, more preferably from 60 to 80% by weight because of still high impact properties.

Specific examples of the non-conjugated diene include dicyclopentadiene, 1,4-hexadiene, cyclooctadiene, dicyclooctadiene, methylenenorbornene, 5-ethylidene-2-norbornene, 5-vinyl-2-norbornene, 5-methylene-2-norbornene, 5-methyl-1,4-hexadiene, 7-methyl-1,6-octadiene, and the like.

The ethylene-propylene copolymer rubber of component (B) generally has MI (measured at 230° C. with a load of 2.16 kg) in the range of 0.2 to 10 g/10 minutes, preferably from 1.0 to 8.0 g/10 minutes. When MI is at the outside of the range of 0.2 to 10 g/10 minutes, a problem occasionally arises in that the copolymer is not easily mixed with the polypropylene. When MI is in the range of 1.0 to 8.0 g/10 minutes, the copolymer rubber is advantageous with respect to the properties of kneadability.

The ethylene-propylene copolymer rubber of component (B) may be used singly or as a combination of two or more types. The amount of component (B) in the resin composition can be selected in the range of 18 to 30% by weight, preferably 18 to 25% by weight, more preferably 20 to 25% by weight, of the resin composition. When the amount is less than 18% by weight, sufficient dimensional stability cannot be obtained. When the amount is more than 30% by weight, properties such as stiffness and the like, is inferior. When the amount is in the range of 18 to 25% by weight, or in the range of 20 to 25% by weight, the product is more excellent in dimensional stability and appearance.

The talc used as component (C) in the resin composition is not particularly limited. Talc having an average particle diameter of 5 μm or less and an aspect ratio of 10 or more is preferable because of better dimensional stability. The amount of component (C) in the resin composition is selected in the range of 10 to 20% by weight, preferably 10 to 17% by weight, more preferably 10 to 15% by weight, of the resin composition. When the amount is less than 10% by weight, sufficient dimensional stability cannot be obtained. When the amount is more than 20% by weight, appearance of the molded product is inferior. When the amount is in the range of 10 to 17% by weight, or in the range of 10 to 15% by weight, the product is more excellent in appearance.

In the resin composition described above, it is necessary that the ratio $(MI)_{PP}/(MI)_{EPR}$ of MI of the polypropylene of component (A) and MI of the ethylene-propylene copolymer rubber of component (B) be 10 or less, preferably 7 or less. When this value is more than 10, sufficient dimensional stability cannot be obtained. When this value is less than 7, the resin composition is more advantageous with respect to the coefficient of linear expansion.

It is also necessary that PDI of the resin composition described above, which is calculated from the frequency-storage modulus curve measured with a composition consisting of components (A), (B), and (C) alone at the temperature of 230° C., be in the range of 20 to 100. When PDI is at the outside of the range specified above, appearance of the surface of the product obtained deteriorates. More specifically, defects in the molding, such as flow marks and deforms, are formed. The lower limit of PDI described above is preferably 40, more preferably 45, most preferably 50. The upper limit of PDI is preferably 90, more preferably 70, most preferably 60. The range of PDI in the present invention is preferably 40 to 90, more preferably 45 to 70, most preferably 50 to 60. When PDI is in the range of 40 to 90, or in the range of 45 to 70, the molded product is more excellent with respect to the appearance.

PDI described above is calculated according to the following method.

A frequency-storage modulus $G'(\omega)$ curve, such as the curve shown in FIG. 1, is obtained by using a cone-disc type rheometer at the temperature of 230° C. From the curve thus obtained, frequencies $\omega_1$ and $\omega_2$ corresponding to the moduli $G_1(3\times10_4$ dyne/cm$^2)$ and $G_2(1\times10^6$ dyne/cm$^2)$, respectively, are obtained. PDI can be obtained by: PDI= $\omega_2/10\times\omega_1$. This value represents broadness of the molecular weight distribution, and a larger value can be considered to show a broader distribution.

To the resin composition described above, other additives, such as heat stabilizers, weathering stabilizers, antistatic agents, lubricants, slipping agents, nucleation agents, flame retardants, coloring agents, reinforcing materials, and fillers, such as glass fibers, calcium carbonate, carbon fibers, and the like, may be added, if necessary, within the range in which the object of the present invention is not adversely affected.

The process for preparation of the resin composition described above which is used in the present invention is not particularly limited, and processes conventionally used for preparation of polypropylene resins can be adopted. The order of addition of components in the mixing can be suitably selected. The resin composition can be prepared, for example, by kneading necessary amounts of components (A), (B) and (C) and various additives used according to necessity in a kneading apparatus, such as a kneader, a roll-mill, a Barnbury mixer, or the like, a single screw extruder, or a twin screw extruder.

The molded protective strip of the present invention can be obtained by molding the resin composition thus obtained by GIM. The process of GIM is not particularly limited as long as the process can form a cavity at the inside of the melt resin composition by injecting a pressurized gas after the mold cavity is filled with the melt resin composition. In a preferable process of molding, it is desirable that a gas channel having a larger thickness is extended continuously in the mold from the inlet of the gas to the end of the mold, and the location of the cavity formed at the inside of the melt resin by the injection of gas is limited to the part along this gas channel guide. When the gas channel having a larger thickness is not present continuously from the inlet of gas to the end of the mold, fluidization of the resin by the pressurized gas is insufficient and stiffness of the molded product is decreased. When the pressurized gas enters into a part other than the part along the gas channel having a larger thickness, strength of this part of the molded product is decreased.

The protective strip for automobiles of the present invention molded as described above is used as an automobile part which can be attached to the side part of automobiles to prevent damages to the body. Shape of the protective strip is not particularly limited. The preferable example of the protective strip includes a molded article of a belt shape having a width of 100 mm or less and a length of about 1000 mm which is attached to doors on the sides of an automobile at a position extending from the front part to the rear part of the body. A protective strip having such a molded structure that it is attached to the body with an adhesive or mechanically with clips is advantageously used because the protective strip is more easily attached to the body.

To summarize the advantages obtained by the invention, the molded protective strip for automobiles can be prepared by GIM, does not use a vinyl chloride resin which has been used conventionally, shows almost no heat shrinkage, has a small coefficient of linear expansion, is excellent in dimensional stability, and exhibits excellent appearance as an exterior part of automobiles.

The invention will be understood more readily with reference to the following examples; however, these examples are intended to illustrate the invention and are not to be construed to limit the scope of the invention.

Properties of a resin composition and a molded product were obtained according to the following methods.
(1) Heat shrinkage of a molded product Heat shrinkage was obtained from the dimensional change of a molded product before and after heating at 80° C. for 1 hour.

(2) Coefficient of linear expansion of a molded product

Dimensions of a molded product at −30° C. and at 80° C. were measured, and an average coefficient of linear expansion was obtained from the difference in the dimension.

(3) Appearance of a molded product

Flow marks on a molded product were visually observed, and the result was classified into the following classes:
◯: excellent appearance
Δ: flow marks found
x: significant flow marks found
xx: poor appearance (4) PDI of polypropylene and a resin composition A frequency-storage modulus G'(ω) curve was obtained by using System 4 produced by Rheometrix Company at the temperature of 230° C. with the torque of 20%. PDI was obtained from this curve.

Materials shown in the following were used as components (A), (B), and (C) of the resin composition. (A) Polypropylene The following types of so-called block polypropylene containing a part of homopolymer of propylene and a part of copolymer of ethylene and propylene were used.

PP-1: MI, 30 g/10 minutes; PDI, 30; content of ethylene unit, 6% by weight.

PP-2: MI, 20 g/10 minutes; PDI, 15; content of ethylene unit, 6% by weight.

PP-3: MI, 30 g/10 minutes; PDI, 15; content of ethylene unit, 4% by weight.

PP-4: MI, 20 g/10 minutes; PDI, 40; content of ethylene unit, 7% by weight.

(B) Ethylene-propylene random copolymer rubber

EPR-1: MI, 6 g/10 minutes; content of propylene unit, 20% by weight

EPR-2: MI, 3 g/10 minutes; content of propylene unit, 26% by weight

EPR-3: MI, 0.1 g/10 minutes; content of propylene unit, 22% by weight (C) Talc

A product of Fuji Talc Co., Ltd., trade name, LMS300.

EXAMPLE 1

By using a kneading extruder 2FCM produced by Kobe Steel Works Co., Ltd., 65 parts by weight of PP-1 as the polypropylene, 25 parts by weight of EPR-1 as the ethylene-propylene copolymer rubber, and 10 parts by weight of talc were kneaded together, and the resin composition obtained was formed into pellets. The components had $(MI)_{PP}/(MI)_{EPR}$ of 5, and the resin composition had PDI of 60.

The resin composition obtained above was molded by GIM by using a 850 ton molding machine produced by Mitsubishi Heavy Industries Co., Ltd. and a mold which has a belt shape of 1,000 mm long and 50 mm wide and is attached with a gas channel continuous from the inlet of the pressurized gas to the end of flow. The pressure applied to the mold was adjusted to 350 ton. The pressure of gas injection was 10 to 20 MPa, the time of gas injection was 2 seconds, and the retention time of gas was 15 seconds. As the standard process, the resin composition was injected for 3 seconds, and then a gas was injected for 2 seconds. However, when uneven gloss was found, the resin composition and the gas were injected simultaneously for about 0.1 to 1 second.

Physical properties of the mold product are shown in Table 1.

EXAMPLES 2 TO 5

Resin compositions were prepared by using the components of types and amounts shown in Table 1, and molded by GIM, according to the same processes as those in Example 1. Types and amounts of the components used in the resin compositions and physical properties of the molded products obtained are shown in Table 1.

TABLE 1

| Example No. | 1 | 2 | 3 | 4 | 5 |
|---|---|---|---|---|---|
| resin composition amount (part by weight) | | | | | |
| (A) | | | | | |
| PP-1 | 65 | — | — | — | — |
| PP-2 | — | 65 | — | 60 | — |
| PP-3 | — | — | 65 | — | 65 |
| (B) | | | | | |
| EPR-1 | 25 | — | — | 20 | 25 |
| EPR-2 | — | 20 | 25 | — | — |
| (C) | | | | | |
| talc | 10 | 15 | 10 | 20 | 10 |
| $(MI)_{PP}/(MI)_{EPR}$ | 5 | 6.6 | 10 | 3.3 | 5 |
| PDI | 60 | 50 | 30 | 40 | 30 |
| process of molding | GIM | GIM | GIM | GIM | GIM |
| properties of the molded product | | | | | |
| heat shrinkage (%) | 0.05 | 0.04 | 0.05 | 0.04 | 0.05 |

TABLE 1-continued

| Example No. | 1 | 2 | 3 | 4 | 5 |
|---|---|---|---|---|---|
| coefficient of linear expansion | $5 \times 10^{-5}$ | $5 \times 10^{-5}$ | $6 \times 10^{-5}$ | $5 \times 10^{-5}$ | $5 \times 10^{-5}$ |
| appearance of the surface | o–Δ | o | Δ | Δ | Δ |

COMPARATIVE EXAMPLE 1

A resin compositions was prepared by using the components of types and amounts shown in Table 2 according to the same process as that in Example 1, and molded by the conventional injection process. Types and amounts of the components used in the resin composition and physical properties of the molded product obtained are shown in Table 2.

COMPARATIVE EXAMPLES 2 AND 3

Resin compositions were prepared by using the components of types and amounts shown in Table 2, and molded by GIM, according to the same processes as those in Example 1. Types and amounts of the components used in the resin compositions and physical properties of the molded products obtained are shown in Table 2.

TABLE 2

| Comparative Example No. | 1 | 2 | 3 |
|---|---|---|---|
| resin composition amount (part by weight) | | | |
| (A) | | | |
| PP-1 | 65 | — | 60 |
| PP-4 | — | 60 | — |
| (B) | | | |
| EPR-1 | 25 | — | — |
| EPR-3 | — | 20 | 20 |
| (C) | | | |
| talc | 10 | 20 | 20 |
| $(MI)_{PP}/(MI)_{EPR}$ | 5 | 200 | 300 |
| PDI | 60 | 1,000 | 60 |
| process of molding | conventional | GIM | GIM |
| properties of the molded product | | | |
| heat shrinkage (%) | 0.2 | 0.05 | 0.05 |
| coefficient of linear expansion | $5 \times 10^{-5}$ | $6 \times 10^{-5}$ | $6 \times 10^{-5}$ |
| appearance of the surface | x | xx | x |

What is claimed is:

1. A molded protective strip for automobiles prepared by the gas injection molding of a resin composition which comprises:

(A) 55 to 70% by weight of propylenic polymer selected from the group consisting of isotactic propylene homopolymer and propylene block copolymer,
  (B) 18 to 30% by weight of ethylene-propylene copolymer rubber, and
  (C) 10 to 20% by weight of talc; has a ratio $(MI)_{PP}/(MI)_{EPR}$ of 10 or less, wherein $(MI)_{PP}$ represents a melt index of the polypropylene of component (A) and $(MI)_{EPR}$ represents a melt index of the ethylene-propylene copolymer rubber of component (B); and has a polydispersity index of 45 to 70, wherein the polydispersity index is calculated from a frequency-storage modulus curve obtained with a composition consisting of components (A), (B), and (C) alone at the temperature of 230° C. and wherein said molded protective strip is prepared by gas injection molding.

2. A molded protective strip for automobiles according to claim 1, wherein the composition has a ratio $(MI)_{PP}/(MI)_{EPR}$ of 7 or less.

3. A molded protective strip for automobiles according to claim 1, wherein the polypropylene of component (A) has $(MI)_{PP}$ of 0.5 to 100 g/10 minutes.

4. A molded protective strip for automobiles according to claim 1, wherein the ethylene-propylene copolymer rubber of component (B) is a copolymer of ethylene and propylene or a copolymer of ethylene, propylene, and a non-conjugated diene.

5. A molded protective strip for automobiles according to claim 1, wherein the ethylene-propylene copolymer rubber of component (B) has an initial modulus of 400 kg/cm² or less.

6. A molded protective strip for automobiles according to claim 1, wherein the ethylene-propylene copolymer rubber of component (B) has $(MI)_{EPR}$ of 0.2 to 10 g/10 minutes.

* * * * *